(12) United States Patent
Stockwald et al.

(10) Patent No.: US 7,701,141 B2
(45) Date of Patent: Apr. 20, 2010

(54) HIGH PRESSURE LAMP AND ASSOCIATED OPERATING METHOD FOR RESONANT OPERATION OF HIGH PRESSURE LAMPS IN THE LONGITUDINAL MODE, AND AN ASSOCIATED SYSTEM

(75) Inventors: Klaus Stockwald, Germering (DE); Herbert Weiß, Deisenhofen (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 820 days.

(21) Appl. No.: 11/444,370

(22) Filed: Jun. 1, 2006

(65) Prior Publication Data

US 2006/0273723 A1    Dec. 7, 2006

(30) Foreign Application Priority Data

Jun. 1, 2005   (DE) .................. 10 2005 025 155

(51) Int. Cl.
    *H01J 61/30*   (2006.01)
(52) U.S. Cl. .................. 313/634; 313/635; 313/638
(58) Field of Classification Search .......... 313/634–643
    See application file for complete search history.

(56) References Cited

U.S. PATENT DOCUMENTS

| | | | | |
|---|---|---|---|---|
| 4,503,356 | A * | 3/1985 | Kobayashi et al. | 313/634 |
| 4,724,361 | A * | 2/1988 | Wada et al. | 315/246 |
| 5,486,737 | A * | 1/1996 | Hrubowchak et al. | 313/634 |
| 5,773,937 | A | 6/1998 | Miyazaki et al. | |
| 6,184,633 | B1 | 2/2001 | Kramer | |
| 6,400,100 | B1 | 6/2002 | Kramer | |
| 6,661,173 | B2 * | 12/2003 | Koenigsberg et al. | 313/634 |
| 6,786,791 | B2 * | 9/2004 | Koenigsberg et al. | 445/26 |
| 6,815,893 | B2 * | 11/2004 | Kakisaka et al. | 313/634 |
| 7,057,348 | B2 * | 6/2006 | Miyazawa | 313/634 |
| 7,262,553 | B2 * | 8/2007 | Brates et al. | 313/634 |
| 2002/0079841 | A1 * | 6/2002 | Higashi et al. | 313/623 |
| 2002/0158580 | A1 * | 10/2002 | Uemura et al. | 313/643 |
| 2002/0179859 | A1 * | 12/2002 | Takeji et al. | 250/503.1 |
| 2002/0185974 | A1 * | 12/2002 | Nakano et al. | 313/623 |
| 2002/0185979 | A1 * | 12/2002 | Jackson et al. | 313/642 |
| 2003/0057836 | A1 * | 3/2003 | Koenigsberg et al. | 313/634 |
| 2003/0080681 | A1 * | 5/2003 | Kakisaka et al. | 313/573 |
| 2003/0117075 | A1 | 6/2003 | Kramer | |

(Continued)

FOREIGN PATENT DOCUMENTS

EP    1 058 288    12/2000

(Continued)

OTHER PUBLICATIONS

European Search Report dated Oct. 1, 2009 of European Application No. 06011023.6.

*Primary Examiner*—Bumsuk Won

(57) ABSTRACT

The high pressure discharge lamp is fitted with a discharge vessel that has an inside volume with an inside length IL and a maximum inside diameter ID, and that is subdivided into a middle region of constant inside diameter ID and two end regions of variable inside diameter, an electrode projecting into the discharge vessel in the end region in each case. In addition, the discharge vessel has an aspect ratio of 2.5 to 8, preferably 3 to 6, the end region exhibiting a given length LRD in which the inside diameter is reduced to at least 85% of ID.

23 Claims, 8 Drawing Sheets

U.S. PATENT DOCUMENTS

| | | |
|---|---|---|
| 2003/0117085 A1 | 6/2003 | Kramer |
| 2003/0117086 A1 | 6/2003 | Kramer |
| 2004/0095076 A1 | 5/2004 | Kastle et al. |
| 2004/0263080 A1* | 12/2004 | Brates et al. ............... 313/634 |
| 2005/0067975 A1 | 3/2005 | Chen |
| 2005/0184640 A1* | 8/2005 | Yamashita et al. .......... 313/493 |
| 2006/0049760 A1* | 3/2006 | Lenz et al. .................. 313/624 |

FOREIGN PATENT DOCUMENTS

| | | |
|---|---|---|
| EP | 1193734 A1 | 4/2002 |
| EP | 0926703 B1 | 5/2002 |
| EP | 1 394 838 | 3/2004 |

* cited by examiner

HIGH PRESSURE LAMP AND ASSOCIATED OPERATING METHOD FOR RESONANT OPERATION OF HIGH PRESSURE LAMPS IN THE LONGITUDINAL MODE, AND AN ASSOCIATED SYSTEM

TECHNICAL FIELD

The invention relates to a high pressure lamp and associated operating method for resonant operation of high pressure lamps in the longitudinal mode, and an associated system. The invention relates preferably to a high pressure lamp having an elongated ceramic discharge vessel that defines a lamp axis A and that has an inside volume with an inside length IL and a maximum inside diameter ID, and that is subdivided into a middle region of constant inside diameter ID and two end regions of variable inside diameter, an electrode in the end region projecting into the discharge vessel in each case. High pressure discharge lamps with the ceramic discharge vessel, preferably with an aspect ratio of at least 2.5, are involved here.

BACKGROUND ART

U.S. Pat. No. 6,400,100 has already disclosed a high pressure lamp and associated operating method for the resonant operation of high pressure lamps in longitudinal mode, and an associated system. A method is specified there for finding the second longitudinal acoustic resonant frequency. It proceeds from the fact that during the continuous traveling of the frequency that excites the longitudinal mode, the resonant frequency in a vertical operating position can be found through the occurrence of a relative increase in the operating voltage of the lamp. It emerges that this method can be used to find the longitudinal frequency for a segregated arc state in vertical resonance, and then to retain it. However, depending on the filling composition of the metal halide filling and on the instant in the sequence of the search procedure, the frequency thus found can be placed substantially too high such that an excitation of the acoustic resonance at the frequency found with the aid of the abovenamed method results in an inadequate mixing and does not neutralize the segregation sufficiently well. Moreover, implementation in an electronic ballast is expensive. Further documents that are concerned with reducing the segregation by targeted excitation of the second longitudinal mode are, for example, US 2003/117075, US 2003/117085, US 2005/067975 and US 2004/095076. Use is made in all these documents of a ceramic discharge vessel with a high aspect ratio of at least 1.5, and which is cylindrical. The ends are straight or hemispherical.

Similar attempts have already been carried out with the aid of known metal halide lamps that still exhibit the previously customary discharge vessel made from silica glass, see U.S. Pat. No. 5,773,937. An attempt had been made here, as well, to use as straight as possible a discharge vessel with a cylindrical middle part. Only of necessity are the ends rounded off and then lead to the pinch seal. Ceramic discharge vessels are described there as well, but are obviously designed for sodium discharge lamps.

U.S. Pat. No. 6,469,442 and US-A 2004/104677 disclose a ceramic discharge vessel having beveled end parts. However, it is not operated in resonant mode.

DISCLOSURE OF THE INVENTION

It is an object of the present invention to provide a high pressure discharge lamp having a ceramic discharge vessel having an elongated ceramic discharge vessel that defines a lamp axis A and that has an inside volume with an inside length IL and a maximum inside diameter ID, and that is subdivided into a middle region of constant inside diameter ID and two end regions of variable inside diameter, an electrode in the end region projecting into the discharge vessel in each case, which lamp is optimally set to operation with acoustic resonance.

A further object is to provide an operating method with which color control is possible for metal halide lamps, in particular for vertical operation, and largely suppresses segregation in the process. A further object is to provide a system composed of a lamp and an electronic ballast.

This object is achieved by means of the following features: the discharge vessel has an aspect ratio of 2.5 to 8, in particular 3 to 6, the end region having a given length LRD in which the inside diameter is reduced to at least 85%, preferably to at least 60%, of ID such that there remains at the end of the discharge vessel an end face that has at least 15%, preferably at least 20% of ID as inside diameter IDE.

Particularly advantageous refinements are to be found in the dependent claims.

The inventive operating method is aimed at exciting one or more resonant modes which contain the second longitudinal resonance or are coupled thereto. What is meant thereby, in particular, are frequencies such as are designated as combination mode in US 2005/067975, that is to say a mode whose frequency is calculated, for example, from the frequencies of longitudinal and further azimutal resonance in accordance with the law. It is possible in this case to make use, if appropriate, of amplitude modulation and, in particular, to clock by means of pulse width modulation.

This provides, in particular, possibilities for the color control of metal halide lamps by means of clocked and/or structured amplitude modulation, for example in the form of pulse width variation, if appropriate combined with pulse height variation, in conjunction with an unchanged lamp power level.

It is assumed in this case that there is a narrow tolerance range for the inside length when there is a prescribed geometry of the discharge vessel. It constitutes that dimension of the lamp which defines the longitudinal acoustic resonances that must be excited for a possible optimum mixture of the arc plasma, particularly in the case of a vertical operating position.

Because of the demixing, by comparison with a horizontal operating position greatly varied speeds of sound result in a vertical operating position, these being caused by the demixing in conjunction with vertical convection of the particles radiating in the plasma.

The invention proceeds, in particular, from an operation with a carrier frequency of the lamp current in the medium HF range. The carrier frequency corresponds approximately to the frequency of half the second azimutal acoustic resonance when the lamp is in the customary operating state. Carrier frequency is always understood as a frequency either of the current signal or of the voltage signal. By contrast, it is always the power frequency that is decisive for the excitation of the acoustic resonance, said frequency lying at double the excitation frequency of current or voltage.

One point of reference is, for example, the conical geometry of the discharge vessel of a 70 W lamp, the carrier frequency lying in the range from 45 to 75 kHz, typically at 50 kHz, there preferably being impressed as FM modulation on this carrier frequency a sweep frequency whose value is selected from a range from 100 to 200 Hz. It is advantageous to impress on this operation an amplitude modulation that is characterized by at least one of the two parameters of AM degree and duration of the AM, that is to say a pulse pause ratio and time-controlled AM depth AM(t).

In addition to the method, the invention also includes systems in which the described procedures are implemented.

In detail, an aspect ratio (inside length/inside diameter) of the discharge vessel of at least 2.5, in particular L/D=2.5–5.5, is preferred in the case of highly efficient metal halide lamps having a ceramic discharge vessel with a large inside length. In this case, the intensity of one or more longitudinal modes (preferably the second or fourth) is excited with the middle to high frequency AM operation via the amplitude modulation degree. In these modes, the filling is transported into the central region of the discharge vessel, and the filling distribution is thereby set along the arc in the discharge vessel. This is especially important, in particular, in the case of lamps operated vertically or obliquely (>55° inclination angle of the lamp). The composition of the vapor pressure is variant thereby, and so too is the spectral absorption of the deposited filling constituents. The modulation frequency (fundamental frequency of the AM) for exciting the longitudinal modes is typically in the frequency range of 20-35 kHz. Given a carrier frequency of typical 45-75 kHz, and FM (frequency modulation) with sweep modes in the range of approximately 100-200 Hz is carried out to this end.

Typical metal halide fillings contain DyJ3, CeJ3, CaJ2, CsJ, LiJ and NaJ, possibly also TlJ.

To date, various operating modes have been described for stably setting segregation suppression in lamps with a high aspect ratio of the discharge vessel. To date, the prior art has described only purely cylindrical discharge vessels that have been regarded as ideal for these operating modes.

However, it emerges surprisingly that a purely cylindrical shape is not optimum, rather, it appears that shapes with a different inside contour and design of the electrode back space exert a clear influence on the stability of the acoustic modes used.

It emerges, in particular, that in the case of a few particularly well suited operating modes that use the second longitudinal acoustic resonance to suppress the segregation—particularly with simultaneous use of FM and AM modulated HF current waveforms, or given temporary sequential use, in particular FM modulation alternately with fixed frequency operation, see U.S. Pat. No. 6,184,633, for example—purely cylindrical shapes of a discharge vessel even produce acoustic instabilities on the basis of the high resonator quality, and thus are suitable for the operation mentioned only to a limited extent. Electronic ballasts have so far been required to make use of expensive and complex control mechanisms in order to control these instabilities.

A specific design of the inside contour of the discharge vessel and, in particular, of the electrode back space, is now proposed; it can preferably be applied for an operating mode that uses at least at times the second acoustic longitudinal resonant mode or the combination of this mode with the excitation of radial or azimutal modes.

The proposed solution is particularly effective for discharge vessels with an aspect ratio AV of at least 2.5 and at most 6. A range of $4 \leq AV \leq 5$ is particularly preferred. In other words, it is to hold that:

$$2.5 \leq IL/ID \leq 6 \qquad (1)$$

The aspect ratio is defined as a ratio of inside length IL to inside diameter ID(=2*IR) where IR=inside radius. In this case, the inside radius IR relates, however, only to a middle part of the discharge vessel that remains cylindrical.

The end regions, however, experience a specific shaping. Given a prescription of the electrode insertion length as parameter LINS, the discharge vessel is to have a varied design of the inside contour that is oriented on this parameter. The magnitude of LINS is preferably to lie in the range of 7-21% of the total inside length IL, that is to say $$0.07*IL \leq LINS \leq 0.21*IL \qquad (2)$$

The length LRD of the modified end region is to extend, starting from the point of maximum IL, over a length of at least 0.5 LINS and at most 1.5 LINS. This maximum value is of physical significance, and defines its so-called electrode space length ERL, so that it holds that:

$$ERL=1.5*LINS.$$

It emerges that the diameter IDE must be reduced in the modified end region at least to 85% of the original diameter ID, that is to say IDE$\leq$0.85 ID. This constriction permits an increased damping characteristic to be produced for higher harmonics of the second longitudinal such that a sufficient stability is achieved in tuning to the mixing longitudinal modes.

Furthermore, it has emerged in particular that a vertical course of the wall in relation to the lamp axis should be avoided over the region in which the inside diameter tapers from ID to 0.85 to 0.15 ID. At these perpendicular sections, reflections of acoustic longitudinal waves that amplify the longitudinal resonances would occur. However, a perpendicular wall section of sufficiently small format is not excluded in this case as long as its extent corresponds to at most 0.05*ID, because such small surfaces to not reflect markedly.

Contours of the end region that run obliquely to the lamp axis and thus to the direction of formation of longitudinal modes and that taper the inside diameter at least down to 0.6*ID in an approximately continuous fashion have proved to be advantageous. This corresponds in three directions to a conical taper.

The transition contour of the end region can, however, also run concavely, that is to say in a fashion cambered outward—for example in the manner of a hemispherical shell—or convexly, that is to say in a fashion cambered inward—for example as a surface of rotation of an elliptical section, and can then, starting from a constriction to 0.6*ID, for example, give way again as end face to an inside wall running perpendicular to the lamp axis. As appropriate, this can be understood directly as a transition into the capillary or as a stopper part. It is particularly preferred for two different curved sections, a concave and a convex one, to lie one behind another.

In the event of a concave course of the end region, the radius of curvature KR should be at most equal to half the inside diameter IR=ID/2 as a maximum, while in the case of a convexly or linearly running conical taper the tangent at the inner end point of the end region should adopt an acute angle $\alpha e$ of at most 45° to the axis-parallel alignment of the middle region.

An example of a purely convexly curved end region is an inside contour shaped like a trumpet funnel, in particular an inside contour shaped as a section of a hyperboloid.

In particular, the damping is strongly influenced by a central zone of the edge region of length LRD at a distance from the end of the inside volume that extends, seen from the end of the discharge vessel, at least from 0.40*LRD to 0.60*LRD. The aim here is for the tangent angle $\alpha t$ of the inside contour relative to the axial direction, measured from the axis, to lie preferably in the range between αt=15° and αt=45°. It lies with particular preference in the range between αt=25° and αt=35°.

One criterion for the particular selection of the course of the inside contour of the end region is, in particular, the resonator quality given excitation of the 2nd longitudinal acoustic resonance. The resonator quality must selectively achieve a satisfactorily high dimension for the excitation of the 2nd longitudinal resonance 2L. The resonator quality can be derived from the power components in the power frequency spectrum that are required to excite the second longitudinal. It lies typically at approximately 15 to 25% of the lamp power in this range.

Depending on the operating mode, this also holds for resonances coupled to this resonance such as occur in the case of mixed modes, for example radial-longitudinal or azimutal longitudinal resonances. The excitation modes 1R+2L or 3AZ+2L are typical. Best suited are those contours that at the same time exhibit a much reduced resonator quality for high harmonics of the 2L and thus dampen these as far as possible.

Excellent conditions for the design of the inside contour of highly efficient ceramic lamps for operation in a combined AM+FM mode are achieved in the event of a targeted combined excitation of the 2nd+4th longitudinal resonance and their combination with the longitudinal-radial resonance in conjunction with the best possible suppression of the 8th longitudinal resonance and their resonance combinations.

This firstly requires in essence the provision of a sufficiently large end face at the resonator end whose diameter IDE makes up at least 15% of the cylindrical inside diameter ID. The inside diameter DIE should preferably make up at least 20% of the cylindrical inside diameter ID.

The combination of the abovementioned acoustic resonances in a discharge vessel permits the setting of improved, acoustically produced convection cell patterns under conditions of increased pressure in the convection induced arc plasma region in such a way that combinations of increased light yields of 120 lm/W or even more, with a color rendition Ra of more than 85 and typically 90 can be achieved over lengthy operating times of typically 4000 h-6000 h in conjunction with a good maintenance response.

It emerges here that a constriction of the lamp inside contour in the end region of the discharge vessel over a length LRD of $LRD=0.095 \times IL$ to $0.155 \times IL$, a typical value being $LRD=0.125 \times IL$, is preferred.

Here, LRD is referred to the entire inside length IL of the lamp, and ends in an end face with a reduced inside diameter IDE. These boundary conditions are ideal for producing a stable convection cell structure that is produced via the standing acoustic wavefield in the plasma gas in order to achieve an optimum mixing of the arc plasma gas such that color demixing of the plasma is completely suppressed in any desired lamp position.

Over the end region, the inside diameter of the lamp is preferably continuously reduced in such a way that a transition from the approximately cylindrical middle part of inside diameter ID to the tapering end region opens in a concave radius R1 of the taper.

It is preferred that $ID/6 \leq R1 \leq ID/2$. Typical values are 0.35 ID to 0.5 ID. Particularly preferred is a region LRD of the taper that is roughly speaking curved in the shape of an S. Starting from a concavely running radius R1, the reduction in the inside diameter merges in this case via a point of inflection into a convexly running radius L2 that strikes an end face running perpendicular to the lamp axis with the resulting diameter IDE.

It is preferred that $ID/4 \leq R2 \leq ID$. A typically value is R2=0.65 ID.

In particular, it has emerged that the diameter of the end face IDE should lie in a range which is between 0.15 and 0.85 ID.

Particularly good results are achieved when this diameter IDE is suitably adapted to the original inside diameter ID of the discharge vessel. In rough outline, the ratio between IDE and ID should be smaller, the larger ID itself. The guide that VID=IDE/ID=a×ID+b, where $a=-0.120$ to $-0.135$, and where $b=1.0$ to 1.1, is preferred.

In the case of cylindrical end shapes, the values of the resonator quality for 2L and higher harmonics such as 4L or 6L are comparable to one another. This leads in the case of substantially cylindrical discharge vessels to the fact that higher harmonic resonances that are excited, for example, in the case of an amplitude modulation, are established—owing to the very high resonator quality—when the acoustic 2nd longitudinal resonance is overshot. This results in the formation of additional acoustically determined convection cells that can lead in some circumstances to impedance jumps and to extinction of the arc discharge. When the 2nd longitudinal resonant frequency $f_{res\_2L}$ is overshot starting from a higher excitation frequency—typically from $f_{start}AM=f_{res\_2L}+5$ kHz to $f_{stop}AM=f_{res\_2L}-5$ kHz in association with a typical AM degree of 15-35%—strong variations in lamp impedance, and arc instability then occur, and this leads to unstable lamp conditions. Setting the excitation frequency to a frequency in the vicinity of the variation in lamp impedance occurring more strongly can also lead to undesired arc instability.

Associated therewith are freely fluctuating lamp impedance values with peak values that exceed 1.5 times the lamp impedance present in the non-excited state. The lamp can become extinguished in this case. It is therefore not possible to set a mode for stable improved suppression of a segregation of the arc column that is present in a vertical or oblique operating position of the lamp.

This is not achieved until the end shapes according to the invention are selected. Overshooting the 2nd longitudinal resonant frequency starting from a relatively high excitation frequency—typically from $f_{start}AM=f_{res\_2L}+5$ kHz to $f_{stop}AM=f_{res\_2L}-5$ kHz having a typical AM degree of 15-35%—leads to the formation of stable arc forms with suppressing of the establishment of relatively high harmonic resonances. The stable formation of two symmetrical arc constriction is seen at approximately ⅓ to ¼ or approximately ⅔ to ¾ of the inside length IL in the frequency range of the amplitude modulation frequency fAM between $fAM=f_{res\_2L}$ and typically $fAM=f_{res\_2L}-1$ kHz. Upon further reduction of fAM, the excitation of the second longitudinal is stably terminated without arc instability ensuing, two arc constrictions that are symmetrical relative to the middle of the lamp being formed, specifically at reproducible cutoff frequencies $fAM_{end}$.

BRIEF DESCRIPTION OF THE DRAWINGS

The aim below is to explain the invention in more detail with the aid of a number of exemplary embodiments. In the drawings.

BEST MODE FOR CARRYING OUT THE INVENTION

Figure 1:
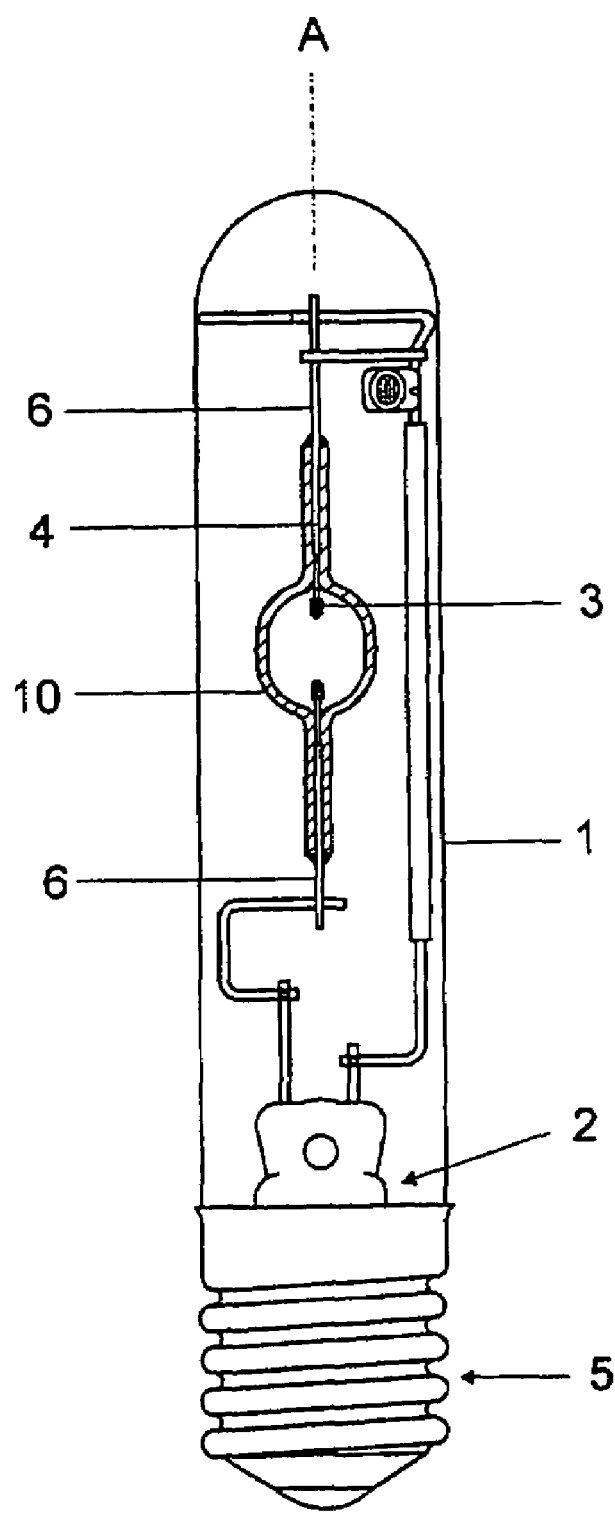
FIG. 1 shows a schematic of a high pressure discharge lamp.

Shown schematically in FIG. 1 is a metal halide lamp having an outer bulb 1 made from hard glass or silica glass, which has a longitudinal axis and is sealed at one end by a plate seal 2. Two external supply leads are guided outward (not visible) at the plate 2. They terminate in a base 5. Inserted axially in the outer bulb is a ceramic discharge vessel 10 made from PCA ($Al_2O_3$) that is sealed at both ends and has two electrodes 3 and a filling made from metal halides.

Figure 2:
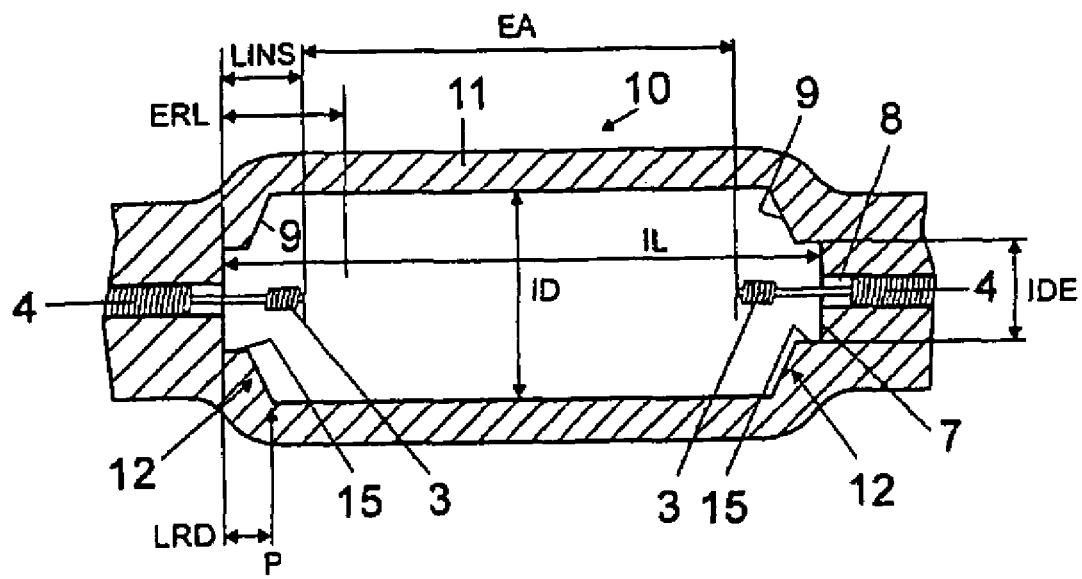
FIG. 2 shows a schematic of a discharge vessel of a high pressure lamp.

The schematic of a discharge vessel 10 with a relatively high aspect ratio ID/IL is shown in FIG. 2. The discharge vessel 10 has a cylindrical central part 11 and two ends 12 with the given inside diameter ID=2*IR, IR being the inside radius, and a given inside length IL. Arranged at the ends 12 of the discharge vessel are electrodes 3 that are connected to internal supply leads 6 (see FIG. 1) by means of the lead-throughs 4. The discharge vessel typically contains a filling made from buffer gas Hg with argon and metal halides, for example a mixture of alkali and rare earth iodides as well as thallium.

Figure 13:
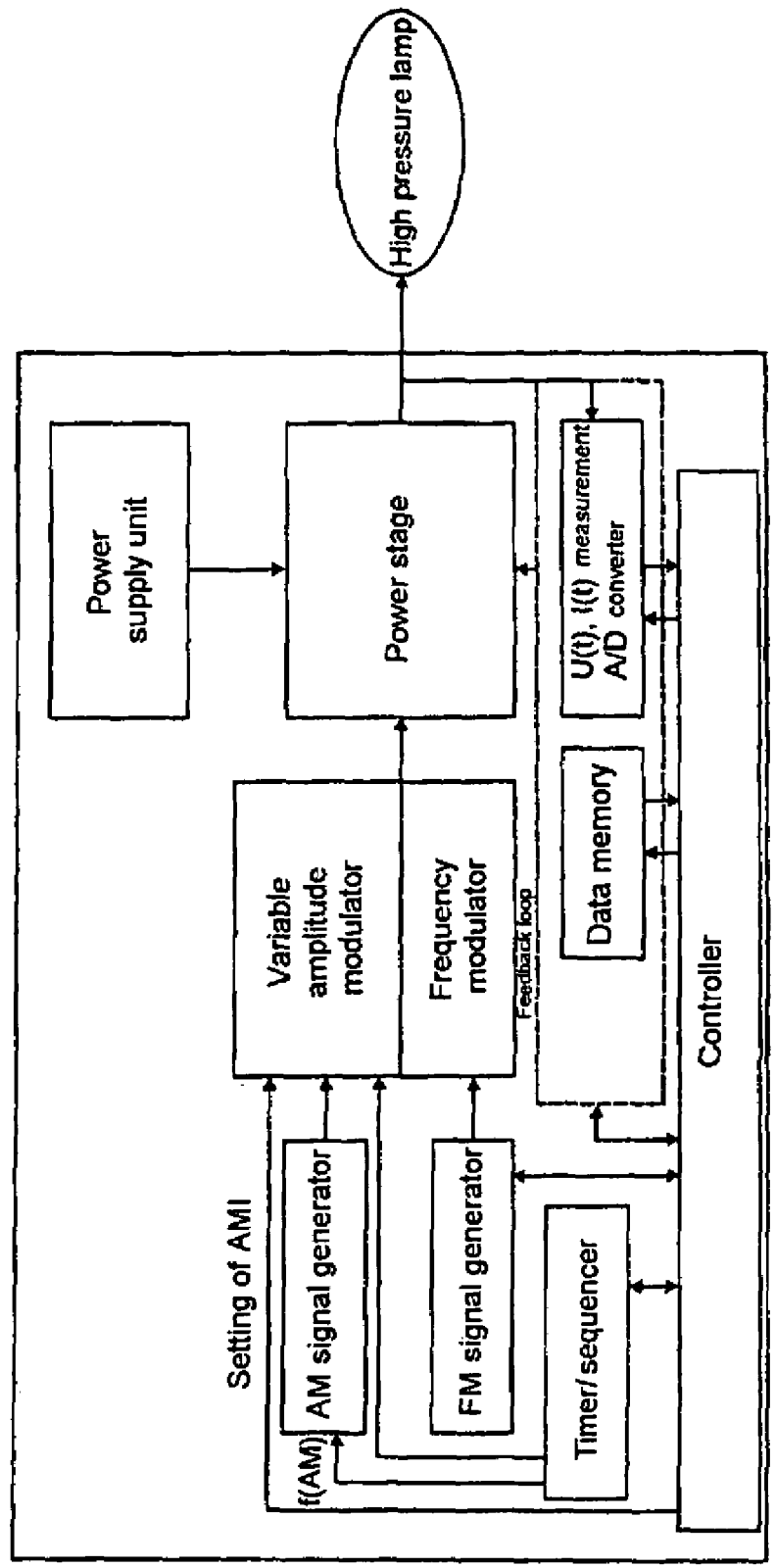
FIG. 13 shows a schematic of the design of an electronic ballast.

The lamp is operated at an electronic ballast, see FIG. 13, at high frequency in acoustically stabilized resonance. The second longitudinal resonance or resonances associated therewith are recommended for the purpose.

Furthermore, the variable LINS is defined in FIG. 2 as the length of electrodes 3 that projects into the discharge volume. The variable ERL is the length of the electrode space and is 1.5 times LINS. Furthermore, the variable LRD is defined as the axial length, which reaches from the end of the discharge volume up to the point P at which the reduction in the inside diameter begins, that is to say where the central part 11 ends. The variable LINS is typically 0.14 IL here. The variable LRD is approximately 0.8 LINS here. LRD should lie generally between 0.5 LINS and 1.5 LINS, in particular in the range of 0.6 to 1.1 LINS. The diameter IDE at the end of the discharge vessel should be reduced to at least 0.6 ID or preferably 0.3 to 0.55 ID.

One exemplary embodiment is a high efficiency metal halide lamp having a power of 70 W. The discharge vessel has a greatest axial inside length IL of 18.7 mm and an inside diameter ID of 4 mm. The aspect ratio is therefore 4.7. The high pressure lamp is filled with 4.4 mg Hg and a metal halide mixture consisting of NaI:CeI3:CaI2:TlI=1.78:0.28:1.93:0.28 mg. The electrode spacing EA is 14.8 mm.

It has been established by preliminary investigations that arc-stabilized operation is possible, the arc being centered on the electrode connecting line in the vertical and horizontal operating positions. The starting point for this is taken as an operation with swept high frequency in the range of 45-55 kHz with a typical sweep rate of fFM=130 Hz.

After the start of operation and a warm-up phase of approximately 120 sec, a segregated, that is to say demixed metal halide distribution is observed along the arc in the vertical operating position. The fraction of metal halides found in the vapor phase is not uniformly distributed over the arc length. The emission of the alkali and RE iodides is concentrated in the lower third of the lamp, whereas it is chiefly the emission of Hg and Tl that is observed in the upper part as far as the upper electrode. In this state, the lamp has a relatively low color rendition and a relatively slight light yield. In addition, the color temperature in the vertical operating position differs substantially from that for the horizontal operating position, specifically by up to 1500 K.

Figure 12:
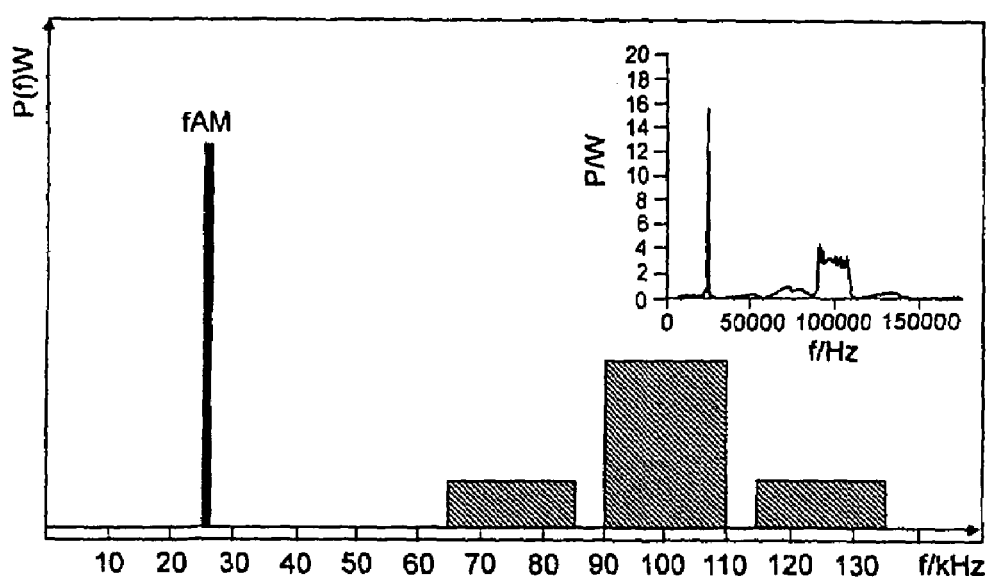
FIG. 12 shows the power spectrum of such a high pressure discharge lamp.

According to the schematic in FIG. 12 (the small picture shows the real measurement), an electric power spectrum is generated in the lamp given a sweep rate of 130 s−1, that is to say over the period of 7.7 ms, in the range of 20 to 150 kHz by impressing an amplitude modulation with a fixed frequency fAM of approximately 25 kHz with an AM degree of 10-30%. The power component in the range of the AM frequency (25 kHz) acts to excite the second acoustic longitudinal resonance f002.

Higher orders are successfully suppressed. The virtually exclusive excitation of the second longitudinal acoustic resonance requires an adequate quality factory of the lamp as cavity resonator (so-called resonator quality). This quality can be characterized by the power component, required for a stable maintenance of the second longitudinal acoustic resonance in the vertical operating position, in the spectral region of the electric power spectrum used for the excitation. This value is typically at least approximately 10 to 20% of the lamp power. However, this minimum value should be adequately exceeded for stable operation. In order to keep fluctuations in the lamp characteristics as low as possible for a relatively large number of lamps, it is therefore rather a value of approximately 15 to 25% of the lamp power that is to be recommended.

Some data for various lamps are summarized in Table 1.

TABLE 1

| | Inside contours for ceramic metal halide lamps | | | | | | |
|---|---|---|---|---|---|---|---|
| | mm | mm | mm | mm | mm | [%] | [%] | [%] |
| | | | | | | Inventive parameters | | |
| | IL | ID | LINS | ERL | LRD | LINS/IL | LRD/LINS | LRD/ERL |
| Cyl. Inside contour 70 W | 19 | 4 | 2 | 3 | 0 | 10.53 | 0 | 0.00 |
| Cyl. Inside contour. With rounded edge region. | 19 | 4 | 2 | 3 | 1 | 10.53 | 50 | 33.33 |

TABLE 1-continued

| | | | Inside contours for ceramic metal halide lamps | | | | |
|---|---|---|---|---|---|---|---|
| mm | mm | mm | mm | mm | [%] | [%] | [%] |
| | | | | Inventive parameters | | | |
| IL | ID | LINS | ERL | LRD | LINS/IL | LRD/LINS | LRD/ERL |
| E. R = 50% IR__70 W | | | | | | | |
| long__taper__ended__contour__70 W  19 | 4 | 2 | 3 | 1.5 | 10.53 | 75 | 50.00 |

An outer conical region 9 at the end 12 of the discharge vessel is shown in FIG. 2 in a fashion running oblique at an angle of approximately 35°. The incline runs approximately from the point P up to a distance of 0.25 LRD from the end of the discharge vessel. The diameter IDE is reduced there to 0.5 ID. This value remains constant for the tubular inner region 15 right at the end of the discharge vessel. The discharge vessel terminates with an end face 7 transverse to the lamp axis or at least substantially transverse to the lamp axis. This end face 7 includes at its center a bore 8 for the electrode and lead-through.

Figure 3:
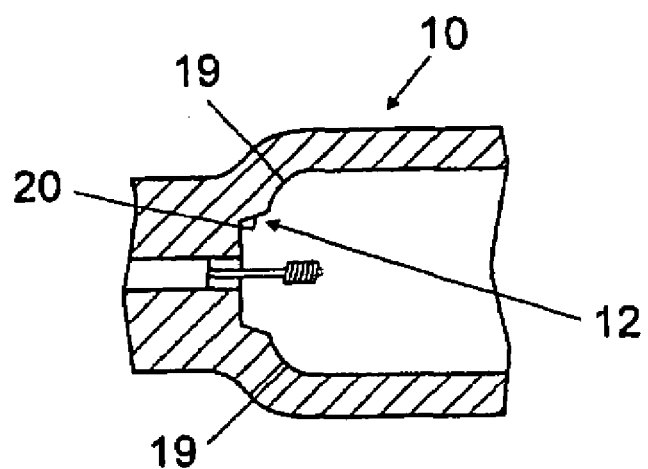
FIGS. 3-9 and 11 show various embodiments of the end of the discharge vessel.

The incline at the end 12 of the discharge vessel 10 is implemented in FIG. 3 by a concave region 19 with an angle of approximately 35°. The incline runs approximately from the point P up to a distance of 0.30 LRD from the end of the discharge vessel. Following thereafter is a region 20 in which the diameter is yet further reduced by a slight conical incline down to a smallest value of IDE of 0.4 ID. The lead-through is a cylindrical Cermet part here.

Figure 4:
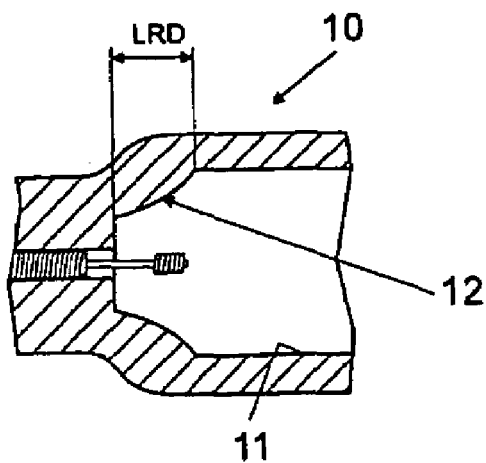

FIG. 4 shows a discharge vessel 10 in the case of which the taper in the region LRD is continuously in the shape of a trumpet funnel. The region LRD adjoins the middle region at the point P. The end section 12 tapers to a minimum diameter IDE of 0.6*ID.

Figure 5:
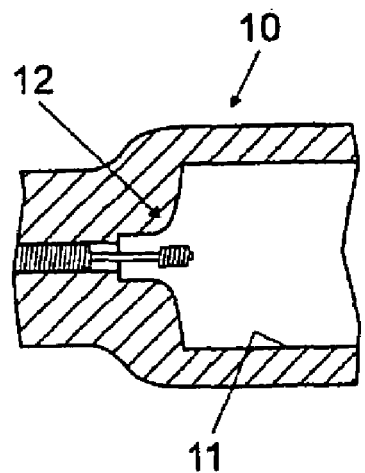

FIG. 5 shows an exemplary embodiment of the discharge vessel in the case of which the end region 12 is convexly curved over virtually its entire radial width IR.

Figure 6:
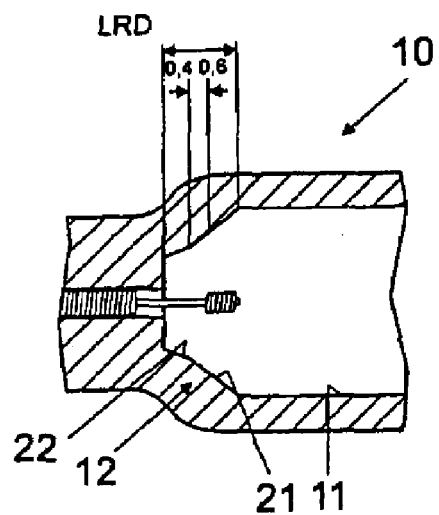
Figure 7:
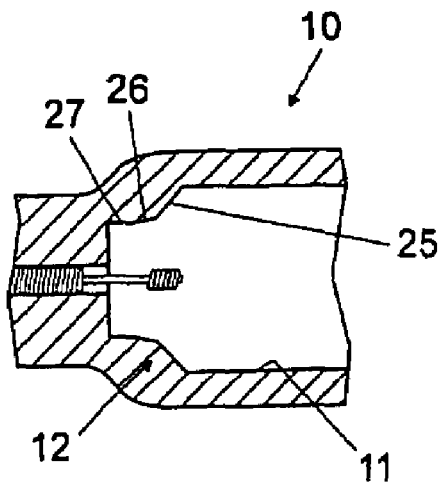
Figure 8:
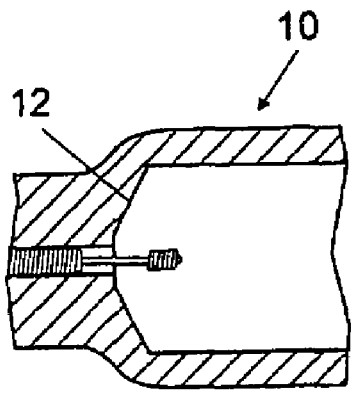

FIGS. 6 to 8 show various conical contours with a different slope of the end region 12. In FIG. 6, a conical surface with a slope of α=31° is used as outer region 21 of the end 12, which does not change, above all over the axial length of 0.4 to 0.6 LRD, the particularly critical region. The inner region 22 is likewise conical but with a lesser slope that, at most, makes up half, here 15°, of the slope of the outer region.

FIG. 7 shows a contour of the end region, the latter being subdivided in three sections of different slope angles α1 and α2. The outermost section 25 has a sharp slope with α1=31°, and the middle section 26 has a gentle slope with α2=16°. They adjoin one another at 0.5*LRD. The innermost section 27 is tubular.

In FIG. 8, the discharge vessel 10 has a contour of the end region 12 in the case of which uniform use is made of a conical surface with α=45° that extends over the full axial length of the region LRD, including 0.4 to 0.6 LRD, the particularly critical region.

Figure 9:
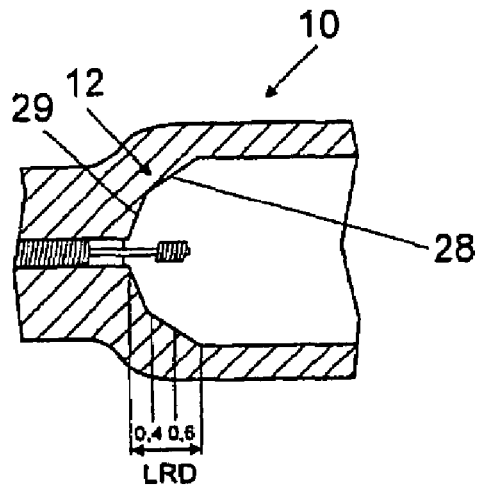

In FIG. 9, the discharge vessel 10 has a contour in the case of which the convex end region 12 is subdivided into three conical sections of different slope angles α1 and α2 and α3. The outer first section 28 has a gentle slope with α1=23°, and the inner second section 29 has a sharp slope with α2=37°. They abut one another at 0.35*LRD, that is to say not until after the critical region of 0.4 to 0.6 LRD.

Figure 10:
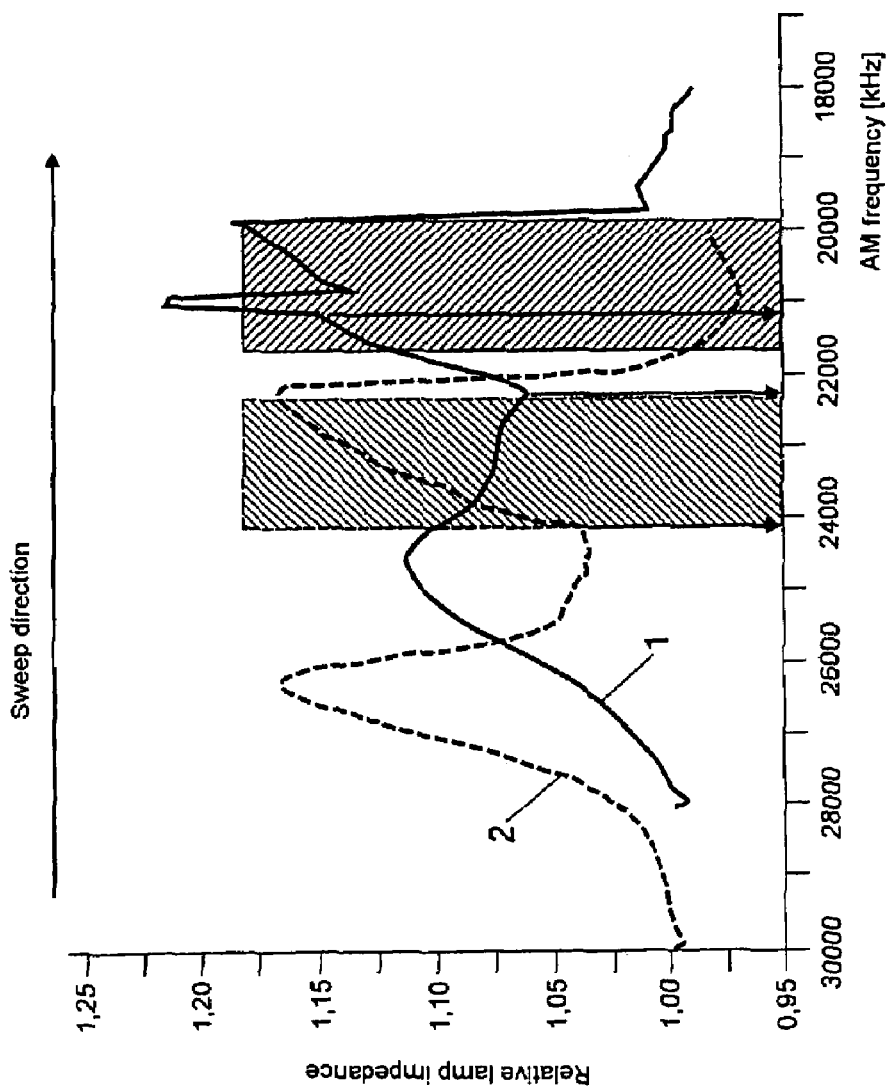
FIG. 10 shows the impedance behavior of such a lamp.

FIG. 10 shows a comparison of the impedance response for a conical inside contour as in FIG. 2, which enables a stable operation, and for a customary purely cylindrical inside contour, which enables an unstable operation. Here, the relative lamp impedance is shown as a function of the AM frequency in kHz during the sweep. The second longitudinal frequency is the base. The AM degree is 24%. The conventional lamp, whose impedance profile is illustrated as curve 1, exhibits unstable resonance phenomena (peak) in the range from approximately 22 to 20 MHz, while the stabilized lamp (curve 2) with improved inside contour (curve 2) reveals a stable rise in the modulated range (here approximately 24 to 22 MHz) that can be used very effectively for optimized operation.

Figure 11:
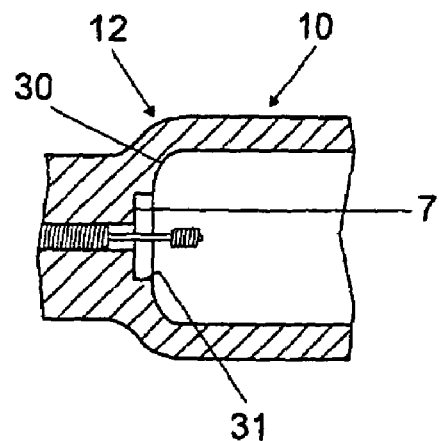

FIG. 11 shows an exemplary embodiment of a discharge vessel 10 that has in the end region 12 a first outer concave section 30 and a second inner straight tubular section 31.

Figure 14:
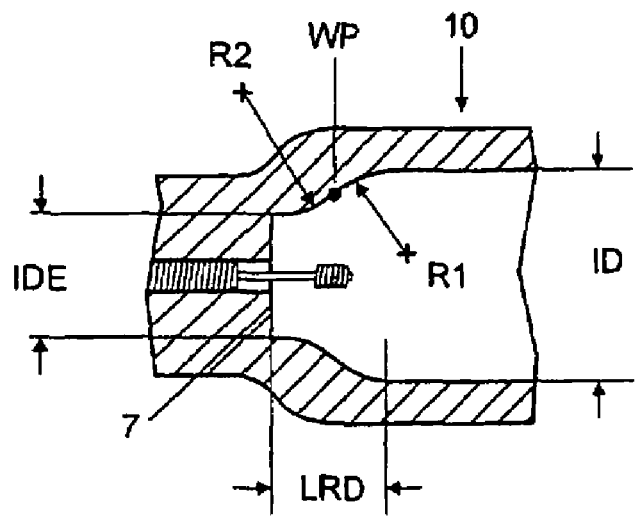
FIG. 14 shows a further exemplary embodiment of an end of the discharge vessel.

Always essential is the presence of an end face at the end of the discharge vessel that is transverse to the lamp axis. It is thereby possible for low harmonics to be specifically excited, and for higher harmonics to be specifically suppressed. In order to achieve this goal, it is particularly favorable when the inclined transition surface between the inner wall and end face has no corners and edges, but is smooth and continuous. Defined transition radii should always be present instead of edges. A particularly suitable shape is that shown in FIG. 14, which shows a discharge vessel 10 with an end region LRD whose inside diameter is reduced at the end face 7 to a value IDE in such a way that the inside contour is firstly concavely curved with a radius of curvature of R1 and is subsequently convexly curved with an inside radius R2 (indicated schematically in FIG. 14). A point of inflection WP lies between the two sections.

Figure 15:
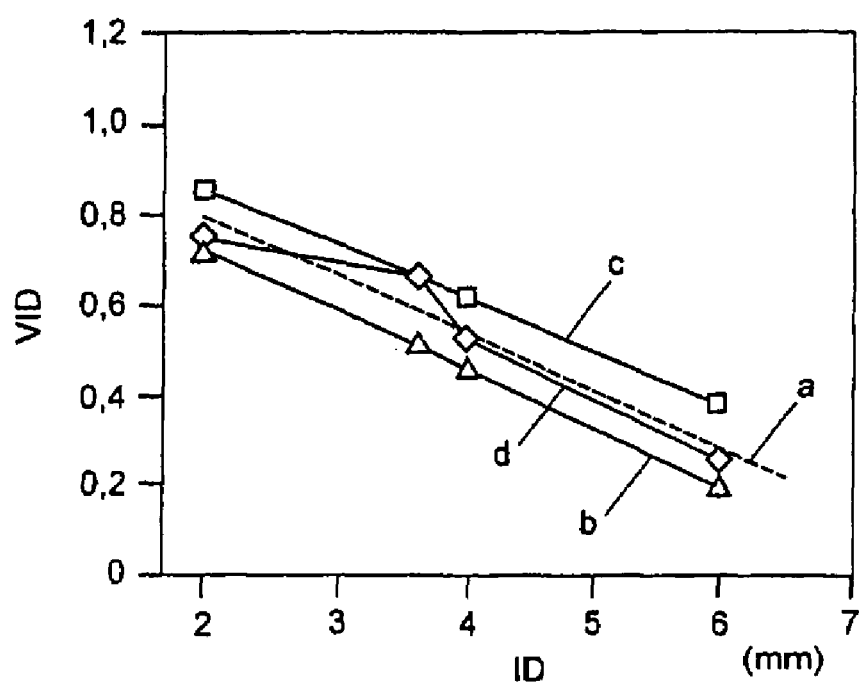
FIG. 15 shows a graph for VID.

FIG. 15 shows a preferred relationship between the inside diameter ID of the discharge vessel and the reduced diameter DIE as a function of the inside diameter (in mm). The ratio VID=IDE/ID should rather be relatively high for small diameters ID, but rather relatively low for large diameters ID. The dashed line a is the optimal dimensioning, the lines b and c specifying a deviation therefrom that still does not lead to a worsening of the mode of operation worth mentioning. The measured values on the curve d are concrete implementations of lamps in the case of which the optimal mode of operation with suppression of higher harmonics was confirmed.

A suitable operating method for such high pressure discharge lamps uses the resonant operation by employing a high-frequency carrier frequency that is, in particular, frequency modulated by means of a sweep signal (FM) and is simultaneously amplitude modulated (AM), a fundamental frequency of AM firstly being defined, the fundamental frequency of AM $f_{2L}$ being derived from the second longitudinal mode.

Here, after the ignition of the lamp and expiry of a period of grace, it is possible to set the color temperature for a prescribed power by virtue of the fact that the amplitude modulation changes periodically between at least two states.

The frequency of the sweep signal can be derived from the first azimutal and radial modes. In particular, a controller can set the fundamental frequency of the AM signal.

Particularly good results are seen when an AM degree is used to excite the second longitudinal acoustic resonance of 10 to 40%, in particularly 18 to 25%. The exciting AM frequency is advantageously selected at between $f_{2L}$ and $f_{2L}-2$ kHz.

In principle, the amplitude of a fixed AM degree can change in stepwise fashion, abruptly, gradually or differentially with a specific periodicity.

A typical operating method proceeds from operating with a carrier frequency in the medium HF range from 45 to 75 kHz, typically 50 kHz, on which there is preferably impressed as FM modulation a sweep frequency whose value is selected from a range from 100 to 200 Hz. Impressed on this operation is an amplitude modulation that is characterized by at least one of the two parameters of AM degree and duration of the AM, that is to say a pulse/pause ratio and a time-controlled AM depth AM(t). It is possible not to use or manipulate the AM until after a warm-up phase. The AM degree is defined as AM-degree=(Amax−Amin)/(Amax+Amin). Here, A is the amplitude.

In addition to the method, the invention includes a ballast in which the procedures described are implemented.

In detail, an aspect ratio (inside length/inside diameter) of the discharge vessel of at least 2.5, in particular IL/ID=3.5–5.5, is preferred for highly efficient ceramic metal halide lamps of large inside length. In this case, the intensity of one or more longitudinal modes (preferably the second mode) is excited with the aid of medium to high frequency AM operation via the amplitude modulation degree. In these modes, the filling is transported into the central region of the discharge vessel, and thus the filling distribution is set along the arc in the discharge vessel. This is especially important, in particular, for lamps operated in a vertical or inclined fashion (>55° inclination angle). The result of this is a variation in the composition of the vapor pressure and also in the spectral absorption of the deposited filling constituents. The modulation frequency (fundamental frequency of the AM) for exciting the longitudinal modes is typically in the frequency range of 20-35 kHz. Given a carrier frequency of typically 45-75 kHz, an FM (frequency modulation) is carried out to this end with sweep modes in the range of approximately 100-200 Hz.

Both the AM degree alone and the duration of the AM frequency that is modulated on can be used for control purposes in the sense of pulse times and pause times. The color temperature can be changed in large ranges in conjunction with a high light yield and unchanged lamp power via these parameters of AM degree and pulse/pause ratio, that is to say the ratio between the time T in which the AM is switched on and the time in which the AM is switched off, T(AM-on)/T(AM-off) for short, as well as, however, a time-controlled variable amplitude modulation depth AM(t), that is to say a superstructure of AM degree.

A block diagram of an associated electronic ballast is shown in FIG. 13. The ballast has the following essential components:

Timer/sequencer: here, the timing pattern is monitored to control the time period of the warm-up phase and inception of the impressing phase after the ignition of the high pressure lamp and its arc transfer. Moreover, the sweep rate for stabilizing the lamp arc is controlled here.

Also controlled are the scanning rates and residence time at the respective frequency points during traversal of frequency scans, as well as the fixing of pause times between consecutive steps in the procedure.

Power stage: full or half bridge with current-limiting elements and typical frequency response. It is coupled to the power supply unit via a supply rail (450 V DC).

Feedback loop: lamp mode detection, appropriate feedback of lamp parameters such as lamp current and lamp voltage in order to set the control parameters and fix the warm-up and/or impressing phase, or to repeat impressing phases with other tuning parameters.

Here, a circuit section is implemented for sufficiently accurate measurement of current and voltage at the EVG output (lamp). The measured values for processing in the controller are further processed thereby using an A/D converter. The data that occur are written into a data memory for further evaluation procedures.

Lamp: high pressure discharge lamp (HID lamp)
FM modulator: high power frequency modulator
AM modulator: variable analogue high power modulator with the possibility of controlling both the frequency fAM and the AM degree AMI
AM signal generator: digital or voltage-controlled oscillator
FM signal generator: digital or voltage-controlled oscillator
Power supply (power supply unit): rail voltage generator
Controller: central control of all units.

A number of exemplary embodiments of the operating method are explained below. It holds in principle that: the operation is performed by using a high frequency carrier frequency that is, in particular, frequency modulated by means of a sweep signal (FM) and which is simultaneously amplitude modulated (AM), a fundamental frequency of the AM firstly being defined, the fundamental frequency of the AM f2L being derived from the second, longitudinal mode. In particular, after the ignition of the lamp and the expiry of a period of grace, the color temperature is set for a given power by virtue of the fact that the amplitude modulation changes periodically between at least two states.

The frequency of the sweep signal is advantageously derived in this case from the first azimutal and radial modes.

The simplest case is operation with the pure carrier frequency. During operation of the lamp, this frequency is frequency-modulated (FM) and typically swept in sawtooth-like fashion for the purpose. This means an AM degree=0, and leads in vertical operation to deliberately set segregation, that is to say the demixing of the plasma. Using the terminology introduced above, this means continuous operation, that is to say T(AM-off)=∞.

Another example is an AM continuous operation, that is to say T(AM-on)=∞. A maximum and minimum amplitude Amax and Amin are observed in this case. This AM runs over the entire operating period.

Use is also frequently made of a mixture of the two states, or a suitable modification. In the simplest case, sections with AM-on and periods with AM-off alternate with one another here regularly or as required. T(AM-on) is the period of feeding AM-on. T(AM-off) is the period of feeding AM-off. The two phases alternate with one another. It has emerged in particular that a relatively low ratio T(AM-on)/T(AM-off), which would correspond to continuous AM operation with an "equivalent" AM degree of approximately 15-35%, leads to cancellation of segregation in vertical operation. FIG. 6 shows the juxture position of periods with AM-off and AM-on schematically.

The ratio T(AM-on)/T(AM-off), that is to say the duty cycle, is preferably between 0 and T(f(AM)) and Tsweep.

However, instead of this a further structure can be impressed on a given AM, either a substructure, for example for the purpose of damping, or a superstructure, for example in the form of a ramp, trapeze or sinus wave. An equivalent AM degree can also be defined here. This can be performed with, or preferably without dead times AM-off. The clocked AM illustrated above is in this sense also a superstructure with a square-wave form.

Given a suitable selection of the "equivalent" AM degree, in a prescribed acoustically settled state of the gas discharge column or plasma acoustic power is coupled into the excited state either in a clocked fashion and/or under the control of the level of acoustic resonance (or under the control of the acoustic intensity). As a result, filling transport processes in the lamp are controlled in such a way that specific color temperatures of the metal halide lamp are associated with specific superstructures in each case.

The damping of the sound waves gives rise to typical periods both for the settling process and for the maximum pause periods T(AM-off) and for the dynamics of the amplitude modulation depth (AM degree), which can be impressed on the exciting current signals.

The AM depth is determined by the following factors:
T1=carrier frequency period;
τ(AM_damp)=damping time in the case of a damped AM signal train;
T2=amplitude modulation frequency period;
AM degree=amplitude modulation degree (typically 15-35%);
T(AM-on)=clock cycle of the switched-on AM;
T(AM-off)=pause period AM.

Possible examples are damped and undamped profiles. The term AM index is sometimes also used instead of the term AM degree. The ratio T(AM-on)/T(AM-off) can be virtually any here, the minimum value of the preferred time intervals for T(AM-on) typically being 5 to 10 periods (corresponding to 0.2-0.4 ms) of the AM frequency, which is typically at 20 to 40 kHz, for example at 24.4 kHz. This ensures that the gas discharge column settles into a natural resonant frequency.

The phase of the signal AM-on is preferably coupled to the phase of the AM signal, but this requirement is not absolutely necessary if the duration of the signal AM-on, that is to say the value T(AM-on) is large enough. This gives rise to minimal duty cycles of the AM of type 0.2/20=1/100. A duty cycle is defined as the ratio T(AM-on)/Tg, Tg being defined above.

A further example of a concrete operating method is subdivided into various operating phases. The position of the resonance f002 in the horizontal operating position is the first to be determined for an individual lamp. This can be performed once in advance by means of various methods, or repeatedly on-line during operation of the lamp, for example by measuring the lamp impedance during operation by impressing a square-wave current and superposing a sinusoidal signal, in which case, for example, the amplitude of the sinusoidal component is to be approximately 5-15% of the current amplitude during variation of the frequency of the sinusoidal signal.

For reliable functioning of the method, it is desirable that a narrow tolerance range for the inside length IL of typically <1%×IL be present for a prescribed geometry of a discharge vessel. The inside length constitutes that dimension of the lamp which defines the second longitudinal acoustic resonance and has to be excited for an optimum mixing of the arc plasma, in particular in the vertical operating position.

In the vertical operating position, the intensified demixing of the filling constituents associated therewith results in greatly changed speeds of sound which have the effect that after start up of the lamp the frequency of the acoustic second longitudinal resonance (f002_vert) is clearly shifted as against the frequency in the horizontal operating position, abbreviated as f002_hor, specifically mostly to higher frequencies. Over the course of time, this resonant frequency then changes during the inventive operating mode, which achieves a gradual mixing, until said frequency again corresponds to that in the case of the horizontal operation, that is to say f002_hor.

Because of the segregation occurring chiefly during vertical operation, deviations are to be seen here in the effective speed of sound of up to 30%, mostly from approximately 10 to 25%, to higher values by comparison with the mixed state in horizontal operating position. For example, deviations in the effective speeds of sound for the Hg/Ar buffer gas mixtures from approximately 15 to 20% by comparison with the mixed operation are found. A concrete measured value was situated at 550 m/s by comparison with 464 m/s.

The acoustic resonant frequency of the ith longitudinal acoustic resonance is generally given in a discharge vessel of inside length IL by the product:

$$f00i = i*cl/(2*IL);$$

It therefore holds for i=2 (second acoustic resonance) that:
$$f002 = cl/IL.$$

Here, cl is the effective (longitudinally effective) speed of sound cl, in which case it holds that $$cl = (R*K*T/M)^{1/2}$$

where R is the general gas constant, K is the compressibility, T is the mean plasma temperature, M is the mean molar mass of the plasma gas, and IL=effective axial length of the discharge vessel.

For azimutal acoustic resonances, the following relationship holds between the tube radius R and an effective (azimutal effective) speed of sound $c_{az}$:

$$fi00 = a_{i0} c_{az}/(2*\Pi*R), \text{ where } a_{i0} \text{ for } i=1, 2, \ldots$$
$$= \text{Bessel coefficient: } a_{10}=1.84; a_{20}=3.05; a_{30}=4.2$$
etc.

The following relationship with the tube radius R and a radially effective speed of sound cr holds for the radial acoustic resonances:

$$f0i0 = a_{0i} c_r/(2*\Pi*R), \text{ where } a_{0i} \text{ for } i=1, 2, \ldots = \text{Bessel coefficient: } a_{01}=3.83; a_{02}=7.016; \text{ etc.}$$

The electric power fluctuations that form are decisive for the excitation of these acoustic resonances in the closed, approximately cylindrical lamp bulb. That is to say, given excitation with the aid of sinusoidal current waveforms of frequency fl, the power frequency fP has the following frequency:

$$fP = 2*fl.$$

In another exemplary embodiment, the operating mode starts from an electric carrier frequency v in the HF region typical of lamp applications, for example v=50 kHz, on which there is impressed as frequency modulation a sweep frequency fFM whose value is selected from a range that extends from the first azimutal to the first radial resonance. Particularly preferred is a value for fFM that is in the vicinity of the mean value, in particular directly at the mean value, between two resonances. A point of reference is a sweep that deviates by up to 10% from the carrier frequency. The sweep rate is typically in the range from 100 to 1000 s−1.

The sweeping operation is preferably designed in a ramp-shaped fashion with rising or falling frequency.

This operating mode uses the effect of arc stabilization on the central axis of the discharge vessel in the vertical and also in horizontal operating position through excitation of centering gas oscillation about the arc core.

If appropriate after observing a period of grace (warming up the lamp), there is furthermore impressed on this fundamental current waveform an amplitude modulation AM whose fundamental frequency is the second longitudinal resonance f002hor in horizontal operating position. The regulation is initially based on this fundamental frequency.

It emerges that in vertical operation the resonance frequencies are shifted by up to 5 kHz by comparison with the horizontal or mixed conditions given the inside dimensions of the discharge vessel that are used here—a typical value is 12 to 24 mm. The procedure described here leads reliably to the desired operation method.

A number of embodiments are suitable as approaches to solving the reliable setting of the best possible mixing of the arc plasma and a far reaching cancellation of segregation. A number of operating methods for setting an AM for the second horizontal longitudinal resonance f002, which is best at effecting mixing, in any desired operating position, preferably for an FM in sweep mode or in the range of a value of approximately 0.9 to 1.1×(f100+f010)/2, are specified here further. This sweep range of 10% fSW corresponds approximately to a window of 5 kHz upward and downward. The frequency fSW can be selected in the region of the first azimutal and radial resonance f100 and f010 preferably in the vicinity of the mean value with a deviation of up to 10%, that is to say 10%×(f100+f010)/2.

A precondition for a method for setting the AM frequency for optimum mixing of the arc plasma in any operating position is firstly to determine and store the position of the second longitudinal resonant frequency f002 in a virtually always already mixed horizontal operating position. In order to set a basic operation with this frequency, it is firstly necessary in the case of each lamp for the geometry of the discharge vessel obtaining there and the composition of the buffer gas to be individually characterized with reference to the acoustic resonances and examined such that in addition to the second longitudinal resonant frequency f002, the first azimutal resonant frequency f100 and the first radial resonant frequency f010 are also known. Furthermore, the mean value of the two frequencies (f100+f010)/2 are also calculated therefrom and stored.

In a first embodiment, a procedure for settling into the most favorable mixed operating state can be implemented by setting the fundamental frequency fAM of the amplitude modulation AM to a value of 1.15 to 1.25 times the frequency f002_hor within an impressing phase of approximately 60 to 150 sec. while observing a warming-up phase (period of grace up to instant t1) of approximately 30 to 80 sec., preferably approximately 60 sec., after the ignition of the arc discharge. Before that, the AM frequency can be selected as desired, but f002_hor is preferably preset. The AM degree can also be previously set as desired in a range from 0 to 25%. The AM degree is set to 15 to 30% at the instant of increasing the fundamental frequency fAM in the impressing phase, it being preferred in this case to set a frequency that is increased by 18-20% by comparison with f002_hor. It is preferred in this case to set the amplitude modulation to approximately 15-25% of the amplitude modulation degree.

The fundamental solution consists in the regulated detection of the optimum frequency point fopt of AM, and of the matching signal level AMI of AM degree for mixing the metal halide plasma of a metal halide discharge lamp controlled by means of acoustic longitudinal resonances, as well as in the provision of an electronic ballast for operating in the optimally mixed mode.

It emerges that—starting from relatively high frequencies, for example 1.25×f002hor, and passing to lower frequencies—a characteristic response of the lamp impedance Z is formed by the occurrence of a local overshooting of Z upon successively sweeping the frequency range ΔF of the AM frequency fAM in which it is possible to achieve a mixing of the segregated, less mixed metal halide plasma.

The AM degree is a measure of the respective electric power referred to the total power that is converted into the excitation of longitudinal resonances. If the AM degree is increased in stepwise fashion, for example in steps of approximately 2.5%, the characteristic response of the lamp impedance is obtained in each case for a given AM degree upon traversal of the frequency range ΔF.

The response of the lamp impedance Z(fAM) in dependence on the frequency fAM over the frequency range ΔF is required as a function of the AM degree and stored as a family of characteristics. As the AM degree increases, firstly one, then two and under certain circumstances even more dynamic extremes of a lamp impedance emerge that follow one another as a function of fAM and are formed and displaced characteristically in the course of the stepwise increase in the AM degree.

Instead of the amplitude modulation degree, in particular, it is also possible for the power signal level of a signal frequency controlling the mixing of discharge containing metal halides to serve as operating parameter, for example the signal level of a linear superposition that causes a mixed longitudinal/azimutal resonance that causes an intensified mixing of the arc plasma similar to that of the second longitudinal resonance.

The method is subdivided into a number of steps and consists of at least two steps.

The first step is a successive scanning of a relatively large frequency interval of the amplitude modulation (fAM). The scanning range lies between an upper starting point ST and a lower end point SP such that the frequency of the frequency starting point ST lies above the endpoint SP.

However, beforehand the frequency range within which a mixing of the metal halides, detectable from a maximum in the lamp impedance, occurs at all is roughly determined in a preparatory step. The end points thereof are noted as FM1 (upper end point of the mixing frequency range) and FM2 (lower end point of the mixing frequency range), the frequency starting point ST and frequency end point SP respectively lying outside the mixing frequency range. Thus, the condition ST>FM1>FM2>SP is to be fulfilled for these frequencies.

Finding the mixing frequency range as preparatory stage of the first step can firstly be determined immediately, for example via coarse scanning with a low signal level of the AM (AMI=5-10%).

In another embodiment, this frequency interval [ST, SP] can already fundamentally be determined and stored in the associated electronic ballast for a geometry of given inside diameter ID and given inside length IL and a given metal halide filling.

The interval width for the first step is fixed thereafter. Typically, both ST and SP should each preferably lie at least 10-15% outside the window defined by FM1 and FM2 (ST>1.10*FM1; SP≦0.9*FM2). The desired value can be preprogrammed in a lamp system comprising lamp and electronic ballast, or be specified as an input command.

A typical interval width of the scanning range ST-SP for the first step is approximately 8-15 kHz.

In a concrete exemplary embodiment, the discharge vessel of the lamp has an inside dimension of 19 mm length and an inside diameter of 4 mm, while the buffer gas is an Hg-argon mixture. Here, the optimally mixing resonant frequency fAM lies between 22 and 25 kHz. FM1 is therefore 25 kHz and FM2 is 22 kHz. Here, the interval can be scanned from ST=30 kHz downward to SP=20 kHz.

The direction of the frequency scanning from the higher ST to the lower end frequency SP follows from the finding that the acoustic resonances, particularly for vertical operation, in the segregated state are systematically shifted to higher frequencies given continuous application of amplitude modulation. This response contradicts the teaching of U.S. Pat. No. 6,400,100. It has also been found that given an adequate signal level with an AM degree of typically 10-40%, a sufficiently slow temporary constant shift, in particular a shifting rate of typically 0.05-1 kHz/sec, of the excitation frequency fAM of the mixing acoustic frequency signal yields an ever better mixing of the lamp plasma, and thus the resonant frequency f002 is shifted toward lower frequencies, in the direction f002hor.

An eminently suitable parameter for monitoring this state of affairs is the mean lamp impedance Z=Urms/Irms such as occurs in the case of temporarily constant shifting of fAM.

The optimum setting does not require a complete characterization of Z as a function of time. Measuring in the desired operating position, in particular a vertical one, suffices as minimum requirement, a one-off complete scanning of the frequency range FM being sufficient, specifically between the limits FM1 and FM2 at which the mixing occurs. It is preferred for the sake of reliability to select a relatively large frequency window between the frequency starting point ST and a frequency end point SP, because no substantial plasma mixing is present at the end point SP, and there is at most a slight plasma mixing present at the upper frequency point ST.

The procedure described uses the mixing of the metal halides in the plasma, which improves gradually as frequency shifting progresses, in order to determine characteristic frequencies, that is to say, in particular, the resonant frequency f002, for the mixing process. It emerges that a constant rate of the frequency shift (frequency scan) should preferably be selected, it being possible for this to find an optimum speed of the order to magnitude of the 0.1 to 0.5 kHz/sec that does justice to normal lamp operation. It is also to be recommended not to apply the procedure until after the heating up phase of approximately 1-3 min.

Depending on the power of the discharge lamp, the improvement of the gas mixing can also be accompanied by a change, both axial and radial, in the modified temperature profile of the gas discharge, and thus also by a variation in the isothermie of the discharge vessel. Depending on the thermal capacity of the discharge vessel, there must be a sufficiently slow adaptation to the new conditions of the plasma up until the thermal equilibrium is reached. This requires time intervals of different length depending on the shape and volume of the discharge vessel.

If the lower frequency FM2 for the acoustically excited mixing of the arc plasma is undershot, an abrupt change in the lamp impedance occurs and the metal halide mixing of the arc plasma goes over again into the state experiencing little influence, or no influence at all.

The following embodiments are particularly preferred.

The following response is observed in essence for all application-relevant metal halide mixtures, for example with alkali halide and/or rare earth halides, in particular iodides such as the following components:

NaI and/or LiI or CsI and rare earth (RE) components CeI3, DyI3, NaI3, PrI3, HoI3, TmI3, DyI3 as well as, possibly, further components of ZnI2, InI, TlI, MgI2, CaI2, Hg and Zn, in particular from molar components of the alkali halide contents $\leq$90 mol %, and the following stepwise procedure is proposed for selecting the optimum operating parameters and is implemented by being set automatically in an appropriately equipped electronic ballast.

Step 1:

The AM degree AMI is used as signal level. AM degree AMI, also denoted as AM index, is defined by $$AMI=(Umax-Umin)/(Umax+Umin).$$

Umax and Umin are the maximum and minimum operating voltages. In order to determine the optimum acoustic plasma mixing, the value of AMI is raised in steps until, during the traversal of the mixing frequency range FM, instead of exhibiting a single maximum the lamp impedance exhibits at least two pronounced, characteristic maxima ZMAX1 and ZMAX2 between which an impedance minimum ZMIN lies.

In some circumstances, conditions can arise that lead vice versa to a reduced lamp impedance in conjunction with a high degree of plasma mixing; it therefore holds more generally that an inverse extreme ZINV lies between two extreme values ZEXTR1 and ZEXTR2.

Consequently, it is advantageous during evaluation to make use of the absolute value of the lamp impedance, at best by comparison with the approximately non-mixed state Zrel, that is to say Z(fAM)~|Z(fAM)/Zrel|.

The absolute change in lamp impedance is advantageously referred to the only insignificantly mixed state at the frequency end points ST and SP, that is to say to Z(fAM=ST) or to Z(fAM=SP). Since both values are approximately equally large, it is possible instead also preferably to make use of their mean value as reference impedance ZREF=(Z(fAM=ST)+Z(fAM=ST))/2).

This normalised impedance can be multiplied by any desired factor k for the purpose of simplifying the evaluation, and so it holds that:

$$Zn(fAM)=k*|Z(fAM)/Zrel|$$

It is understood below as characteristic quantity of the impedance and therefore denoted unchanged as impedance for simplicity.

In the course of the change in frequency of amplitude modulation from ST to SP, changes in the lamp impedance Z(fAM) that are characteristic of the respective metal halide mixture therefore occur and indicate a more intensely mixed plasma. Given a relatively low alkali content, maxima are observed, while for other metal halide mixtures with a markedly increased alkali content characterized impedance drops are to be observed in conjunction with more intensely mixed plasma, and so maxima are formed in the characteristic quantity Zn(fAM) in any case.

The modulation degree AMI is increased in stepwise fashion in order to determine the maxima in Zn(fAM), and a scan is carried out over the mixing frequency interval [ST, SP] repeatedly with AMI held constant in each case until the characteristic changes in impedance of the function Z(fAM) are observed. In this process, a modulation degree AMI can be increased, typically beginning at a value of approximately 5-10% in steps by in each case approximately 2-5% such that approximately 4 to 12 passes are required on average. An adequate maximum value of the AM degree normally lies between 20 and 40%.

It has emerged that below the frequency of the second impedance maximum ZMAX2 there is no longer any plasma mixing in the course of the frequency shift from the upper starting point ST and the lower end point SP in the case of low frequency. That is to say, FM2 is given by the frequency at which ZMAX2 occurs.

The change in Z(fAM) after overshooting of the maximum ZMAX2, adjacent to the lower scanning frequency SP, is clearly higher at the frequency FM2 than in the remainder of the scanning range. The cause is a characteristic change in the temperature profile of the arc discharge. This behavior turns out to correspond for all metal halide discharge plasmas, it being possible to establish an abrupt change in lamp impedance of typically 5-20% upon transition to the unmixed plasma state in the vicinity of SP. This abrupt change occurs at least within a period of a few tenths of a second.

That is to say, the characteristic quantity of the change in the impedance Z reaches an extreme point with the frequency fAM, the value dZ(fAM)/dfAM thus reaching a negative minimum. An evaluation of the impedance characteristic using this criterion can advantageously be used, however, to determine the fixing of the lower AM frequency FM2 for the plasma mixing.

Furthermore, it was found that the AM degree AMI required for operation with long term stability can be determined from the overall behavior of the shifting of FM2 as a function of the AM degree AMI.

For this a Step 2 is Applied:

The rate of displacement of the function FM2(AMI) in the region of an AM degree of approximately 5%-35% is determined in typical steps of approximately AMI=2.5% (for example 10 passes). In this case, an intensified shift of the frequency FM2 with AM degree results upon transition from the formation of a single impedance extreme to a larger number of similar (typically two) impedance extremes. After overshooting of the region of intensified shifting, the function FM2(AMI) again exhibits a clearly lower rate of change as AMI increases further. An AM degree AMIopt is selected that is assigned to the region of increased mixing upon the occurrence of more than one impedance extreme. This is typically an AM degree AMIopt that lies higher by approximately 3 to 10%, in particular by 5%, than that AM degree for which it is precisely the second impedance extreme that forms.

3rd step: Setting the Excitation Frequency for Increased Plasma Mixing:

Starting from ST or at least from FM1 and using the AM index AMIopt established in Step 2, the AM frequency fAM is now moved in the direction of FM2 at a rate of change of frequency comparable to that in Step 1 (typically from 1-0.5 kHz/sec) as far as a frequency point fAMopt that lies at the frequency point of the minimum (more generally: the inverse extreme) of the change in impedance FM2<FMmin<FM1.

It emerges that the mixing of the arc plasma is improved in the region between FMmin and FM2. The narrowest constriction of the arc profile is observed at FM2 as a symmetrical formation of two constricted arc regions. The sharpest change in the plasma impedance is observed after undershooting of the frequency point FM2 in conjunction with a further reduction in frequency owing to the abrupt failure of the mixing impressed from outside, that is to say forced. This effect occurs both in the vertical and horizontal operating positions.

Setting exactly to FM2 has surprisingly proved to be inexpedient for a stable plasma mixing, since effects such as the long term drift and slight changes in the plasma composition owing to consumption or the like, as also changes in the distribution of the filling components can lead very easily to the disturbance of an effective mixing of the plasma that is of long term stability.

There is the remedy here of setting to a somewhat higher frequency. Most favorable both for the targeted setting of the color temperature and for a high light yield, as well as for a high color stability has proved to be the frequency range between the lower cutoff frequency FM2, which is assigned the lower impedance maximum ZMAX2, and the somewhat higher frequency FMmin, which is assigned the impedance minimum ZMIN lying between ZMAX2 and ZMAX1.

The spacing between the lower cutoff frequency FM2 and FMmin depends on the AM degree, and it can therefore be set to a certain extent with the aid of the AM degree. The higher the AM degree is selected, the more pronounced is the impedance minimum ZMIN and the greater is the spacing between FM2 and ZMIN. This consideration can serve, in particular, for fixing the last selected AM degree AMopt.

It has emerged in practical investigations that at least a spacing of 400 Hz, in particular up to 900 Hz, should be set with the aid of the AM degree between the frequency FM2 and FMmin, long term stability thereby being achieved over the entire service life.

It is typically not until after the lamp has run up, that is to say 1 to 3 min after lamp start, that the production of the family of characteristics with the characteristic signal levels AMI and also with the characteristic frequencies and the determination of the cutoff frequencies (ST, SP, CM1, 2) for acoustic plasma mixing, in particular by means of the second longitudinal resonance, are carried out at a rate of frequency shift of approximately 100 Hz/s to 1 kHz/s (AM or HF) with a step width (resolution) of 100 to 200 Hz. This measurement can be carried out once after the first lamp start, or else repeatedly at regular time intervals or with each lamp start.

It proves to be advantageous, furthermore, for a stable long term setting to consider the following findings.

It has surprisingly been found that despite change in the lamp impedance after a lengthy burning time, the current local minimum in the lamp impedance ZMIN(a) continues to be found in the vicinity of the impedance minimum ZMIN(i) found when the lamp was first started, and so ZMIN(i) can always be used as a point of reference for an optimum acoustic plasma mixing.

It has proved that despite a certain drift it is possible after the first scan to continue to track the impedance minimum by means of substantially slower rates of frequency change of 50-100 Hz/min in steps of approx. 50 to 100 Hz.

The color stability of the lamp can be substantially improved with this mode of procedure in a particularly preferred embodiment of the method. It is therefore proposed in addition to use an extended operating method based on the first method of steps 1-3 for the purpose of the color setting of high pressure discharge lamps operated by means of amplitude modulation and HF sweep:

To this end, use is made as starting point of the lower impedance maximum ZMAX2 with frequency FM2, or else of a frequency that is located inside the mixing range and lies higher than FM2 by at least 150 Hz, preferably at least 200 Hz. This frequency is then increased in steps of 50 to 150 Hz, and the lamp impedance is measured in the process. After a settling time period of at least 1 min, the lamp impedance is measured once more at the previously scanned frequency points and stored, for example in a nonvolatile memory in which the data are stored by means of a microprocessor controller.

After the overshooting of a minimum in the lamp impedance that occurs, the last frequency is set immediately before the occurrence of the minimum, that is to say the frequency which immediately precedes the frequency assigned to the impedance minimum in the step sequence.

Such a setting method is very reliable, but this standard method can last a relatively long time because of the long setting times per frequency point (approximately 1 to 5 min).

Consequently, more quickly running frequency scans were carried out as an alternative and compared with the careful, slowly running standard method. The aim in this is to ensure despite the shortness of the measuring time that an adequate filling deposit which corresponds virtually to the conditions in the continuously burning state, represented by the standard method, continues to be ensured.

It emerges that it is even possible to use frequency scans carried out substantially more quickly with frequency shifting rates of 100 to 300 Hz/sec, which really no longer permits adequate filling deposition, can be used to determine the optimum frequency point. The following method is particularly preferred:

To this end, a range of the frequency fAM is scanned at a rate of frequency shifting of 100 to 300 Hz/sec, this being done starting from a high frequency ST that lies at the upper end of the range of plasma mixing as far as a low frequency SP that lies below the least frequency for plasma mixing FM2. A typical width of the frequency interval to be swept is 5-10 kHz. The frequency of the amplitude modulation is shifted in this case, and the lamp impedance Z(fAM) is measured at each frequency measuring point fAM, and specifically with a typical holding time of 0.2 to 1 sec per frequency measuring point. The measured values are stored in a non-volatile memory.

In order to select the frequency point for the optimum operation, use is made of the impedance profile between the impedance maximum ZMAX at the frequency FM2, below which plasma mixing no longer occurs, and the upstream impedance minimum ZMIN at a somewhat higher frequency of FMmin.

A step 4 is therefore carried out after reaching the range by means of step 3.

In this case, a preferred optimum frequency point fopt is selected from the range between the point FMmin and the point FM2+1/5X(FM2−FMmin).

The frequency point fopt that is thereby found has essentially the same properties as that frequency point FMmin which upon a scanning of the lamp impedance that is carried out slowly exhibits a local minimum in the relative change in impedance, and is therefore outstanding as an optimum frequency point for a permanent equilibrium of the mixing.

If the lamp power is regulated by the ballast (for example for the purpose of dimming), it is necessary after another lamp power has been set to repeat the entire measurement operation in order to determine the optimum frequency point for the newly set lamp parameters.

This power matching can be carried out by means of known characteristics of the lamp properties that have already been determined by the manufacturer and, if appropriate, are already stored in the electronic ballast, this being done using the above principle while observing abbreviated step sequences with a substantially shorter expenditure of time than in the case of the first measurement.

The entire method can be carried out automatically by a programmed electronic ballast that is controlled by a microprocessor and it also permits the relevant operating parameters from various lamp types (for example different color temperature) to be matched to a lamp power. A similar statement holds for an identical lamp type with a lamp power that is not too strongly different. Consequently, a single electronic ballast is available for an HF operation of a number of lamp types, accompanied by operational stabilization through the use of longitudinal acoustic resonance modes, preferably of the second acoustic resonance. Finally, this technology also permits the setting of various color temperatures in a lamp, for example by exciting various acoustic resonance modes.

The invention also includes combinations of the above described methods and the implementation of the method in a ballast. The time ranges up to the beginning of the described procedures, that is to say the effective changes in the frequencies and AM degrees, are determined by the power coupling of the ballast in the starting phase. The specified periods can be shortened by up to 50% by means of a short term increased power input directly after the start of the arc discharge. Conversely, the above specified period can also be increased up to 200% when applied for discharge vessels with a particularly high thermal capacity.

Moreover, the measurement steps for determining the frequency fAM and the AM degree can be run through repeatedly.

The manufacturer of the system and/or the ballast and suitable lamps can advantageously preprogramme characteristics for specific combinations of lamp geometry and filling systems in the EB such that it is possible to apply an abbreviated method using only individual partial steps. However, it is recommended to keep checking and, if appropriate, to match the setting of fopt for a given AM degree AMI such that at least step 3 is run through at each lamp start.

In addition, a starting and/or shutdown criterion for the high pressure lamp type to be operated can be set in a defined fashion via automatic measurements of the operating voltage and impedance of the lamp.

In addition to the method, the invention also includes electronic ballasts with microprocessors in which the described procedures are implemented.

For FIG. 10 the following explanation is given:
Horizontal axis: AM frequency [kHz];
Vertical axis: Relative lamp impedance;
Caption: Sweep direction.

What is claimed is:

1. A high pressure discharge lamp configured for resonant operation, the high pressure discharge lamp comprising an elongated ceramic discharge vessel that defines a lamp axis A and that has an inside volume with an inside length IL and a maximum inside diameter ID, and that is subdivided into a middle region of a constant inside diameter, where the constant inside diameter is given by the maximum inside diameter ID, and two end regions of variable inside diameter, an electrode in the end region projecting into the discharge vessel, wherein the inside length IL and the maximum inside diameter ID of the discharge vessel has an aspect ratio of 2.5 to 8, the end region having a given length LRD in which the variable inside diameter is reduced to at least 85% of the maximum inside diameter ID such that there remains at the end of the discharge vessel an end face that has at least 15% of the maximum inside diameter ID as inside diameter IDE, wherein the two end regions are configured to excite at least one acoustic resonance frequency.

2. The high pressure discharge lamp as claimed in claim 1, wherein an insertion length LINS of electrodes is up to 21% of IL.

3. The high pressure discharge lamp as claimed in claim 1, wherein the length LRD of the end region is at least 0.5 LINS and is at most 1.5 LINS.

4. The high pressure discharge lamp as claimed in claim 1, wherein the end region is convexly or concavely curved.

5. The high pressure discharge lamp as claimed in claim 1, wherein the end region is conically shaped.

6. The high pressure discharge lamp as claimed in claim 1, wherein at an axial distance of between 0.4 and 0.6 LRD from the end of the discharge vessel the slope exhibiting an angle of at most α=45° and at least a α=15° to the lamp axis.

7. The high pressure discharge lamp as claimed in claim 6, the slope exhibiting the angle of at most α=35° and at least α=25° to the lamp axis.

8. The high pressure discharge lamp as claimed in claim 1, wherein the insertion angle αe at which the end region begins as seen from the middle region is at most αe=45°.

9. The high pressure discharge lamp as claimed in claim 1, wherein a transition between an inner wall and the end face runs smoothly and without an edge.

10. The high pressure discharge lamp as claimed in claim 9, wherein the transition between the inner wall comprises a convex and a concave section.

11. The high pressure discharge lamp as claimed in claim 1, wherein the discharge vessel exhibits a filling that has metal halides.

12. An operating method for the resonant operation of a high pressure discharge lamp as claimed in claim 1, which uses a high frequency carrier frequency that is, in particular, frequency modulated by means of a sweep signal (FM) and is simultaneously amplitude modulated (AM), in which firstly a fundamental frequency of the AM is defined, the fundamental frequency AM $f_{2L}$ being derived from the second, longitudinal mode.

13. The operating method as claimed in claim 12, wherein after ignition of the lamp and expiry of a period of grace, the color temperature is set for a prescribed power by virtue of the fact that the amplitude modulation changes periodically between at least two states.

14. The operating method as claimed in claim 12, wherein the frequency of the sweep signal is derived from the first azimuthal and radial modes.

15. The operating method as claimed in claim 12, wherein the amplitude of a fixed AM degree changes with a specific periodicity in a stepped, abrupt, gradual or differentiable fashion.

16. A system composed of a high pressure discharge lamp and Electronic Control Gear, with a lamp as claimed in claim 1.

17. The high pressure discharge lamp as claimed in claim 1, wherein the discharge vessel has an aspect ratio of 3 to 6.

18. The high pressure discharge lamp as claimed in claim 1, the end region having the given length LRD in which the variable inside diameter is reduced to at least 60% of ID.

19. The high pressure discharge lamp as claimed in claim 1, wherein there remains at the end of the discharge vessel an end face that has at least 20% ID as inside diameter IDE.

20. The high pressure discharge lamp as claimed in claim 1, wherein the length LRD of the end region is at least 0.75 LINS and is at most 1.25 LINS.

21. The high pressure discharge lamp as claimed in claim 1, wherein the two end regions are configured to excite the second longitudinal resonance.

22. The high pressure discharge lamp as claimed in claim 21, wherein the two end regions are configured to excite the fourth longitudinal resonance.

23. The high pressure discharge lamp as claimed in claim 22, wherein the two end regions are configured to suppress the eighth longitudinal resonance.

* * * * *